United States Patent [19]
Yokoya

[11] Patent Number: 5,255,774
[45] Date of Patent: Oct. 26, 1993

[54] SORTING APPARATUS
[75] Inventor: Jyuji Yokoya, Tokyo, Japan
[73] Assignee: Yoyokanetsu Kabushiki Kaisha, Tokyo, Japan
[21] Appl. No.: 980,874
[22] Filed: Nov. 23, 1992
[30] Foreign Application Priority Data
   Dec. 12, 1991 [JP] Japan .................. 3-328952
[51] Int. Cl.[5] ............................. B65G 47/46
[52] U.S. Cl. ..................... 198/365; 198/477.1
[58] Field of Search ............... 198/369, 477.1, 802
[56] References Cited
   U.S. PATENT DOCUMENTS

| 4,004,681 | 1/1977 | Clewett et al. | 198/365 |
| 4,413,721 | 11/1983 | Bollier | 198/365 |
| 4,635,785 | 11/1987 | Prydtz | 198/365 |
| 4,729,466 | 3/1988 | Bollier et al. | 198/365 |
| 4,744,454 | 5/1988 | Pölling | 198/365 |
| 4,793,462 | 12/1988 | McFall | 198/365 |
| 5,086,905 | 2/1992 | Polling | 198/365 |

FOREIGN PATENT DOCUMENTS
0173399 3/1986 European Pat. Off.
0387427 9/1990 European Pat. Off.

Primary Examiner—Joseph E. Valenza
Attorney, Agent, or Firm—Kenyon & Kenyon

[57] ABSTRACT

In a tray type sorting apparatus where a package is slid downward by tilting a tray obliquely forward in a running direction, an improved tray type sorting apparatus in which a shock applied onto the package is suppressed and which simple construction yields high reliability. Since it is possible to reduce the number of component parts and assembling work therefor, and to simplify the construction, the motion for sorting operation can be simplified, and the speed of the inclination of the tray can be controlled. A pair of spherical cam plates 10 each having a cam groove 14 are integrally formed with operation arms 9. A drive lever 11 for driving each cam plate 10 is fixed through a boss 25 to an end of each operation arm 9. A hollow rotating member 7 is rotatably coupled to an open end of a bent hollow support member 8, and a drive pin 13 fitted into the cam grooves 14 of the spherical cam plates 10 is provided on an inner circumferential surface of the hollow rotating member to rotate the hollow rotating member 7 in conjunction with the rotation of the cam plate.

10 Claims, 11 Drawing Sheets

SORTING APPARATUS

FIELD OF THE INVENTION

The present invention relates to a package sorting apparatus based on a tray carrier system, which is suitable for sorting many kinds of packages in accordance with their destinations and/or classifications while conveying the packages.

BACKGROUND OF THE INVENTION

It is known in convention sorting apparatuses to place the packages to be sorted one after another on consecutive trays mounted on a conveyor and to remove the packages by tilting the trays at their respective sorting positions, thereby causing the packages to slide downward and off the trays.

However, these sorting apparatus are likely to be restricted by the shape of packages, and are therefore often not suitable for sorting many kinds of packages. A further known disadvantage of previously known tray-tilting type sorting apparatus is that they are arranged such that each tray is maintained horizontally during the conveyance of the package and tilted at a predetermined position transversely with respect to the conveyance direction, so that the package must be slid obliquely downward because the tray continues to be moved during such tilt operation. Since the sliding time period and the sliding length required for sliding the package along the tray is dependent on the weight of the package, it is necessary to provide a large area enough to receive the package. If a large receiving area is not provided, the package is likely to be conveyed to a next package receiving area, etc. until the package is completely slid downward and off the tray. The higher the speed of the tray movement, the higher the frequency of this problem. Additionally, since in conventional tray-type sorter the package is slid by its own weight when the latch is released, the sliding speed of the package cannot be controlled, so that some packages may be damaged.

In order to solve the problems noted above, U.S. Pat. No. 4,744,454 discloses a conveyor element in which a tray carrying a package thereon is capable of being tilted obliquely forward. The disclosed conveyor element, however, must have a plurality of bearings and a plurality of shafts for orientation, as well as a universal joint and a spring, and furthermore it is required to provide additionally a lever and a lock mechanism for tilting the tray at a sliding-down position. Further, since the lever is moved three-dimensionally when the tray is tilted, the lever and the tilting switch must be extremely complicated in construction. The entire arrangement of the U.S. Pat. No. 4,744,454 device is therefore quite complicated. As a result, the number of component parts and the assembling work therefor, and the associated increase in cost and maintenance work are undesirable.

ADVANTAGES AND SUMMARY OF THE INVENTION

Accordingly, it is an advantage of the present invention to provide a tray-type sorting apparatus (or sorter) in which a package is surely slide downward by a tray being tilted obliquely forward relative to a conveyance direction while the speed of the tray tilt is controlled, without requiring the complicated construction of known sorting devices and while minimizing the shock applied to a package leaving the sorter.

The advantages of the present invention are achieved by a sorting apparatus which comprises a hollow rotating member rotatable with a predetermined inclined angle relative to a vertical direction on a flatcar running along a guide rail, and a tray fixed to an upper portion of said hollow rotating member for mounting a package thereon, so that said package is slid downward by tilting said tray, said sorting apparatus further comprising a pair of spherical cam plates each provided with a cam groove for controlling the rotation of said hollow rotating member and rotatable about a support shaft disposed perpendicularly to a running direction; drive levers swingable two-dimensionally together with the respective spherical cam plates for controlling the rotation thereof; and a pin projectingly provided on an inner circumferential surface of a lower portion of said hollow rotating member so as to be fitted in said cam grooves, said pin sliding along said guide groove in conjunction with the rotation of said spherical cam plate, thereby rotating and tilting said tray three-dimensionally.

As a result of the improved construction, shock applied to the package is minimized by providing the cam groove arranged such that acceleration/deceleration of the tray at the time points of the beginning and stoppage of rotation is minimized.

During typical operational status, the hollow rotating member is clamped between the pair of spherical cam plates so as not to be rotated, and the tray provided on the top of the rotating member is held horizontally. In this non-sorting position, the package carried on the tray is prevented from sliding downward, and the sorting operation is not performed. By contrast, when the package reaches the sorting position, one of the drive levers is pressed-up backward by a guide member, which is not attached to the sorting apparatus, to rotate the spherical cam plate directly connected to the drive lever. In this operation, the pin provided on the inner circumferential surface of the hollow rotating member is fittingly inserted into and slid along the cam groove of the spherical cam plate, so that the hollow rotating member integral with the pin is rotated in the same direction as the sliding direction of the pin. As a result, the tray provided on the top of the hollow rotating member is inclined obliquely forwardly, so that the package is slid downward and sorted. In addition, since the drive means for moving an entire sorting apparatus may be a linear motor, a friction drive, worm wheel, or the like, the sorting apparatus may be modified or arranged by known means in order that it can be applied to such various kinds of drive means.

BRIEF DESCRIPTION OF THE DRAWINGS

The above and other features and advantages of the present invention will become apparent from the discussion herein below of three specific, but non-limited illustrative embodiments thereof presented in conjunction with the accompanying drawings in which.

DESCRIPTION OF THE PREFERRED EMBODIMENTS

Figure 1:
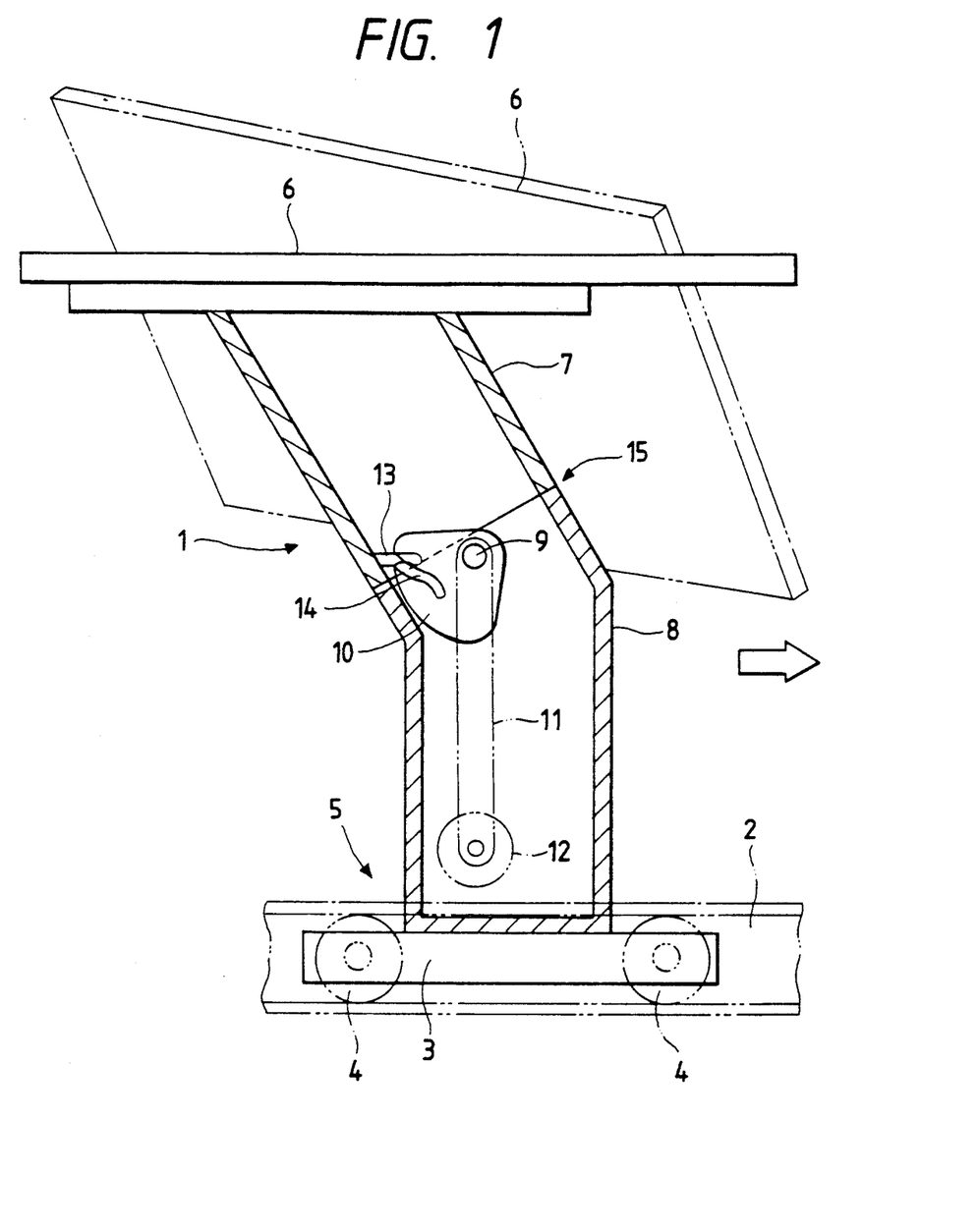
FIG. 1 is a side view showing an entire construction of the tray-type sorting apparatus which is a first embodiment of the present invention.

FIG. 1 is a side view showing a first embodiment of a sorter to which the present invention is directed. The sorter 1 comprises a flatcar 5 running due to the rotation of rollers 4 which are disposed on base 3 and guided along a pair of guide rails 2, a hollow support member 8 bent into generally ">" shape, which is fixed onto the flatcar 5 at an appropriate position, a hollow rotating member 7 coupled to an upper end of the hollow support member and rotatable about an axis inclined with an angle corresponding to a bent angle of the hollow support member, and a tray 6 horizontally fixed onto an upper end of the hollow rotating member.

The upper end of the generally ">" shaped hollow support member 8 is opened, and at which a pair of spherical cam plates 10 each having a cam groove 14 and operation arms 9 supported through bearings by the hollow support member are integrally provided. Drive levers 11 for driving spherical cam plates 10 are fixed perpendicularly to ends of the operation arms, which ends protrude outside the hollow support member, so that the drive levers rotate together with the respective spherical cam plates. A wheel 12 is provided on an opposite end of each drive lever. A pin 13 is provided on an inner circumferential surface of the hollow rotating member 7 near a coupling portion 15. The pin 13 is inserted into and fitted to cam grooves 14 so as to rotate the hollow rotating member 7 in conjunction with the rotation of spherical cam plates 10. Bearings or the like are provided in the coupling portion 15 for the purpose of providing a smooth rotation. Upon its complete rotation, tray 6 is inclined obliquely forward and leftward relative to a conveyance direction as shown by a double-dotted line in FIG. 1.

Rollers 4 are rotated while being kept in contact with inner surfaces of the groove-like guide rails 2 to move the sorter along the guide rails. Further, rollers 4 serve in association with the grooves of the guide rails to prevent the sorter from falling down in the event that the sorting action is destablized by the rotation of hollow rotating member 7. When drive lever 11 is swung around operation arm 9, spherical cam plate 10 is rotated in conjunction therewith in the same direction as the swinging direction of the drive lever. Pin 13 fitted into the cam groove 14 of spherical cam plate 10 is slid along the groove in conjunction with the rotation of the spherical cam plate. Accordingly, the hollow rotating member 7 (integral with the pin 13) is rotated along the sliding motion of the pin.

The tray 6 horizontally provided on the inclined hollow rotating member 7 is rotated spirally in conjunction with rotation of the hollow rotating member 7 so as to be inclined obliquely forward and leftward relative to the conveyance direction (as shown by the double-dotted line). In addition, since it is practically unnecessary to rotate hollow rotating member 7 a full 360°, the hollow rotating member is rotated an appropriate angle.

The drive means for moving an entire sorter may be a linear motor, a friction drive, worm wheel or the like and is expressly not restricted to any specific form. Also, the sorter may be fixed on a conveyor as the driving means instead of rollers. In that event, a portion, e.g. a flatcar or the like, connected to the sorter is provided (but not shown).

Figure 2:
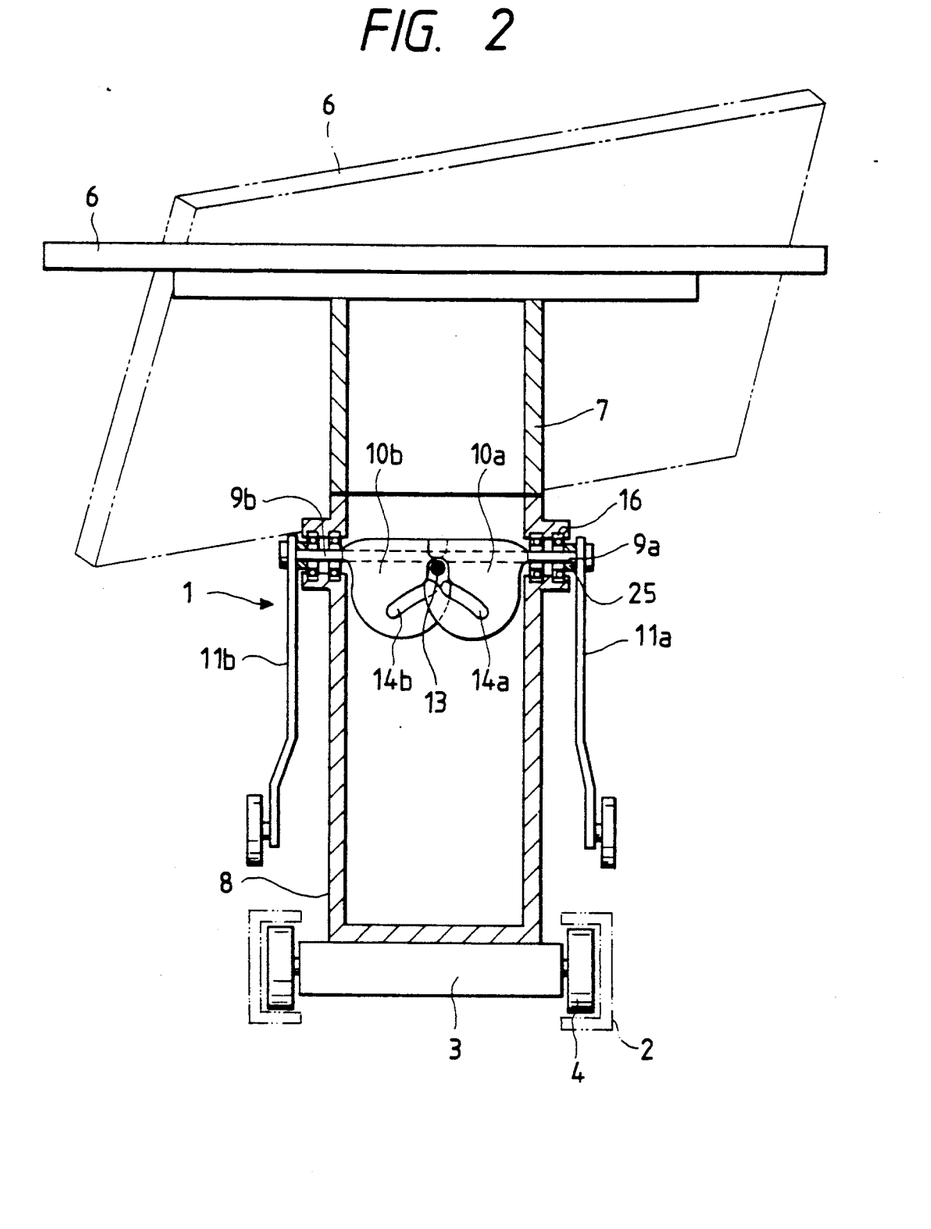
FIG. 2 is a front view showing the entire construction of the tray type sorting apparatus which is the first embodiment of the present invention.

FIG. 2 is a front view as viewed from downstream of the conveyance (i.e. as viewed from the left-hand side in FIG. 1). As illustrated, the sorter has a drive mechanism which is symmetrical but independent with respect to right and left portions of the mechanism. Rollers 4 disposed on the flatcar 3 at both sides thereof travel along the inner surfaces of the groove-like guide rails to move the entire sorter. The member to be driven depends on whether the package is to be delivered to the left or right side relative to the conveyance direction. That is, if the right drive lever 11a is swung in a direction opposite to the conveyance direction, tray 6 is inclined obliquely forward and leftward relative to the conveyance direction (as shown by a double-dotted line in FIG. 2). By contrast, if the left drive lever 11b is swung in the direction opposite to the conveyance direction, tray 6 is inclined obliquely forward and rightward, so that the package is slid downward to an appropriate side.

For purposes of this discussion, the situation where packages are to be sorted to the left side relative to the conveyance direction is described.

When drive lever 11a is swung in the direction opposite to the conveyance direction, operation arm 9a, which in turn is connected to the drive lever 11a through a boss 25 and supported to the hollow support member 8 through a bearing 16s is rotated. In conjunction with this movement, spherical cam plate 10a (integral with the operation arm 9a) is rotated in the same direction as the swinging direction of the drive lever 11a. Then, pin 13, which is fitted into the cam groove 14a of the spherical cam plate and integral with the hollow rotating member 7, is slid rightward along the cam configuration while being maintained in fitted arrangement with the cam groove. Therefore, the hollow rotating member 7, which is fixingly provided with the pin 13 at the inner circumferential surface thereof, is rotated counterclockwise, so that the tray 6 attached to the upper end of the hollow rotating member is rotated in the same direction. As the rotation continues, the inclination of the tray is increased gradually, and then the rotation of the tray is stopped in a state where the tray is inclined obliquely leftward and forward (as in the state of tray 6 shown by the double-dotted line), so that the package slides downward. During the above-noted series of motions, the left drive lever 11b, the operation arm 9b, and he spherical cam plate 10b are not driven, and remain at rest. If the left spherical cam plate 10b is to be rotated, the pin 13 is slid leftward along the cam groove 14b while being kept fitted thereto, but the right cam plate 10a is maintained in a rest position.

Figure 3A:
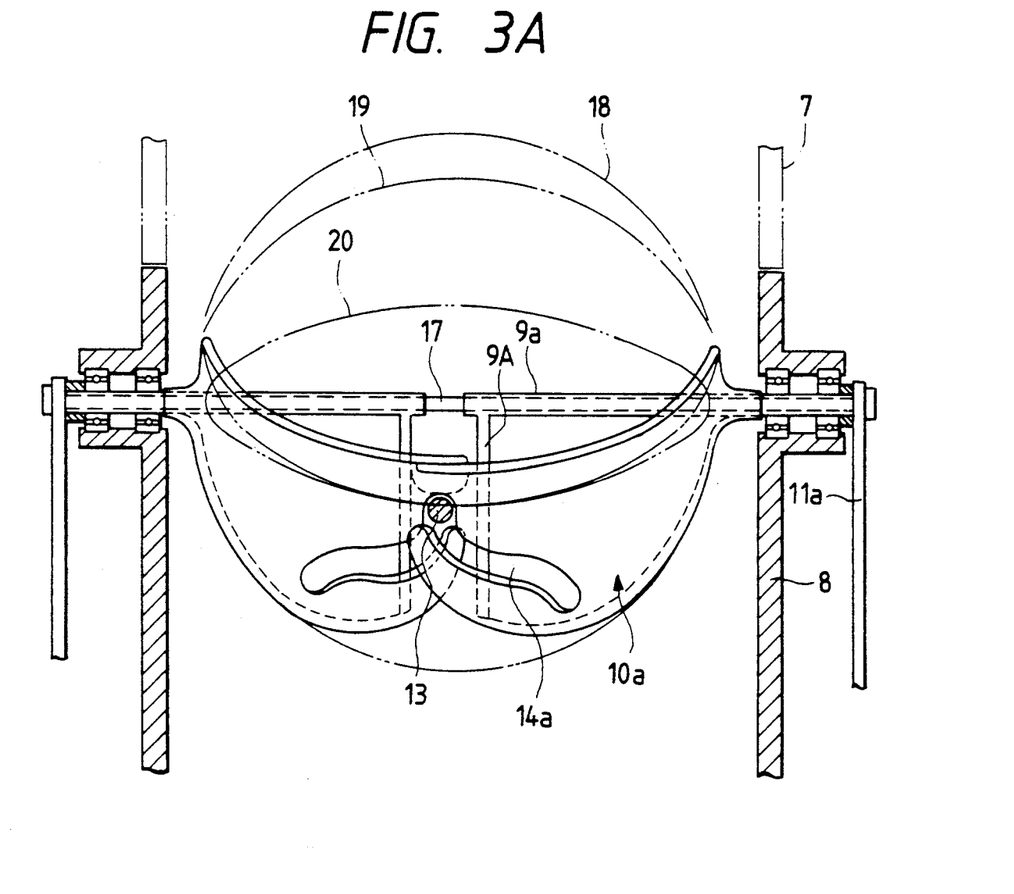
FIG. 3A is an enlarged front view of the sorting apparatus before the spherical cam plate is driven.
Figure 3B:
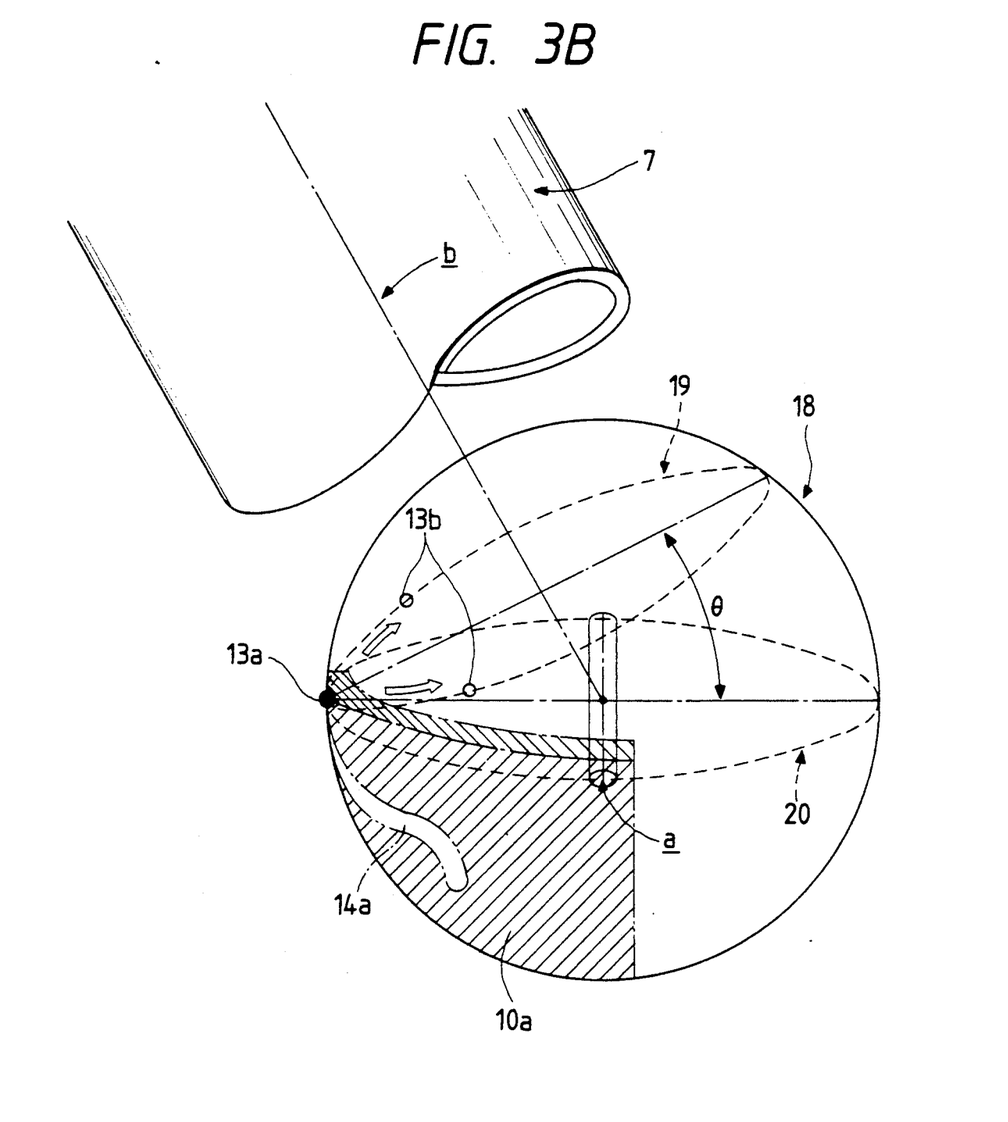
FIG. 3B is a side view schematically showing a major construction of the sorting apparatus.
Figure 4:
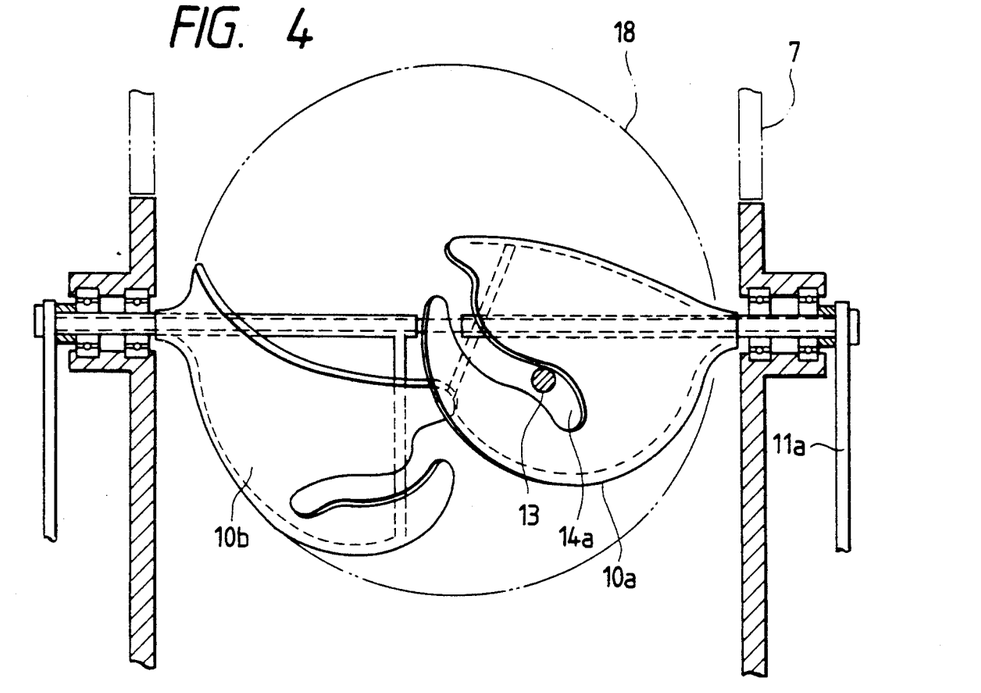
FIG. 4 is an enlarged front view of the sorting apparatus when the spherical cam plates begin to be driven.
Figure 5:
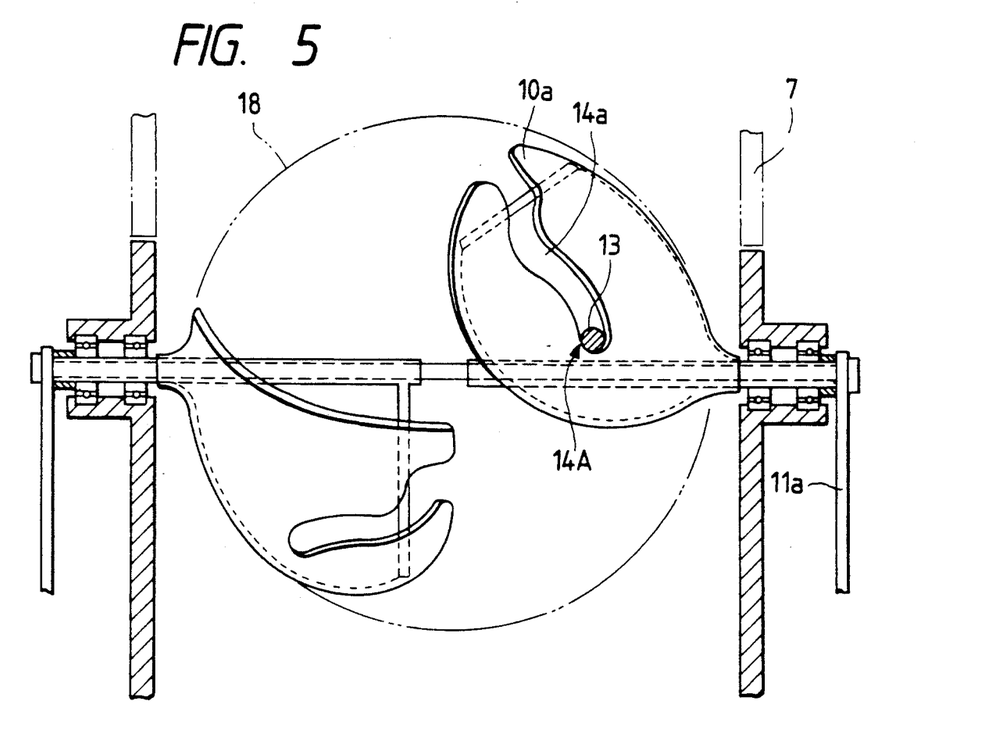
FIG. 5 is an enlarged front view of the sorting apparatus where the spherical cam plate has been driven maximally.

FIGS. 3 to 5 illustrate a motion of the spherical cam plate, and with reference thereto the scenario where the conveyed package is sorted to the left side relative to the conveyance direction (the operation of the right-hand side members relative to a center explained below). FIG. 3A shows the spherical cam plate which is in a locked position for a normal conveyance. Spherical cam plate 10a is rotated about the operation arm 9a along a surface of an imaginary sphere 18 (shown by a double dotted line) and, in conjunction with this rotation, pin 13 is moved on a rotation locus 19 (while being kept fitted into the cam groove 14a). The rotation locus 19 is inclined relative to an imaginary large circle 20 since the hollow rotating member 7 is coupled to the hollow support member 8 to be inclined relative thereto, and the rotation locus is positioned on the surface of the imaginary sphere 18.

More specifically, as shown in FIG. 3B, rotation locus 19 is inclined at angle $\theta$ relative to imaginary large circle 20. A surface of spherical cam plate 10a is positioned on and conformed to imaginary sphere 18 and rotation axis a of cam plate 10a is positioned on a plane defined by imaginary large circle 20, so that spherical cam plate 10a is moved along imaginary sphere 18. Further, a center of rotation locus 19 and a center of imaginary large circle 20 are both positioned on a rotation axis b of hollow rotating member, and the rotation axes and b intersect with each other perpendicularly at the center of imaginary large circle 20. Accordingly, in conjunction with the rotation of cam plate 10a about axis a, the pin 13 is guided by cam groove 14a and moved along rotation locus 19 to rotate hollow rotating member 7 about axis b. In addition, numerical reference 13a designates the position of pin 13 in a case where tray 6 is positioned horizontally, and 13b designates the position of pin 13 in a case where tray 6 is tilted completely.

Figure 6:
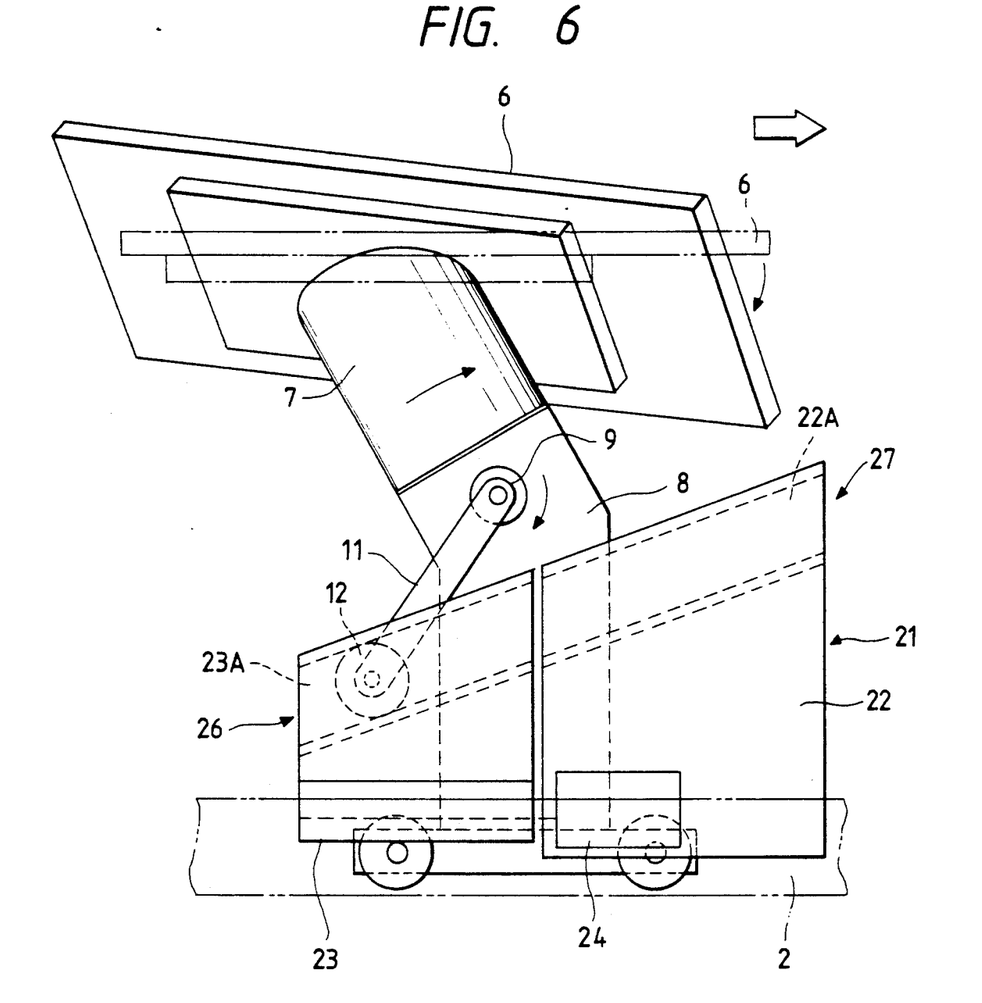
FIG. 6 is a side view showing a positional relationship between the tray type sorting apparatus and the wheel guide member.

Returning to FIG. 3A, drive lever 11a is swung about operation arm 9a in the direction opposite to the conveyance direction by a guide member (shown in FIG. 6). Since pin 13 is retained by a bottom portion of cam groove 14A, the rotation range of the drive lever 11a is restricted, and the drive lever simply conducts an arcuate motion within a predetermined range.

Operation arm 9a has a hollow construction formed by casting integrally with the spherical cam plate 10a and a reinforcing beam 9A. A support shaft 17 passing through a center point of imaginary sphere 18 and penetrating the hollow support member is inserted into the operation arm in order to reinforce the operation arm 9a. In addition, the outer diameter of support shaft 17 is larger than the inner diameter of the operation arm 9a and the support arm is separate from the operation arm, so that the support shaft is prevented from rotating in conjunction with the rotation of the operation arm.

Since operation arm 9a, which serves as a rotation shaft for spherical cam plate, is directed to the center point of the imaginary sphere, spherical cam plate 10a is moved so as to pass the surface of the imaginary sphere 18 during the rotation. The positional relationship between cam groove 14a and pin 13 relative to the diametrical direction of the imaginary sphere is maintained constant without any change since the locus of pin 13 is also disposed on the surface of the imaginary sphere. Due to the configuration of cam groove 14a on the spherical cam plate, the speed of the rotation of the hollow rotating member 7 can be controlled so that it is possible to reduce the shock applied to the package due to the change of inclination of the tray in conjunction with the rotation thereof and the sliding motion of the package.

During normal conveyance where the tray 6 is not inclined, the bias weight of the package causes a force on the tray to rotate it, but the force transmitted from the pin 13 to the spherical cam plate 10a is directed to the axial direction of the operation arm 9a, so that the force cannot rotate the spherical cam plate. Pin 13 is locked at an intersecting point between the large imaginary circle 20 on a center line of the hollow support member 8 and the rotation locus 19. In order that pin 13 is moved in the swinging direction, spherical cam plate 10a is required to be rotated upward, and, therefore, only the swinging of the drive lever 11a can result in the motion of pin 13. Further, spherical cam plate 10a is urged to rotate downward due to its own weight, so that pin 13 is securely locked at that position by the cam plate 10a, preventing the pin 13 from being moved due to the vibration. Accordingly, tray 6 can be held horizontally in a stable manner without provision of additional securing or biasing means such as a spring.

FIG. 4 illustrates an intermediate state where spherical cam plate 10a is rotating along the surface of the imaginary sphere. By swinging drive lever 11a in the direction opposite to the conveyance direction, spherical cam plate 10a, which is partially overlapping and positioned symmetrical with respect to the left spherical cam plate 10b, is rotatingly moved so as to pass an upper surface of the imaginary sphere 18. In conjunction with this motion of the spherical cam plate, pin 13 is moved rightward while being maintained in fitted arrangement with cam groove 14a, so that the hollow rotating member 7 is rotated counterclockwise.

FIG. 5 illustrates a state where pin 13 has been moved to the bottom portion 14A of cam groove 14a and the spherical cam plate has been rotated along the surface of the imaginary sphere so as to be located at its uppermost position. In this state, the tray (not shown in the drawing) is brought into a position where it is inclined leftward and forward relative to the conveyance direction as much as possible. By retaining the pin 13 by the bottom portion 14A of the cam groove, hollow rotating member 7 is locked. Therefore, the swinging angle of the drive lever 11a is prevented from being greater than the angle in this state. By returning drive lever 11a to the position of the normal state through a return member (shown in FIG. 3), spherical cam plate 10a is reversely rotated so as to return to the original position, and therefore the hollow rotating member 7 is reversely rotated clockwise and returned to the normal state position.

FIG. 6 is a side view of a wheel guide member 21 for swinging drive lever 11 about operation arm 9. The wheel guide member includes a fixed guide member 22 and shifting switch member 23. Shifting switch member 23 is arcuately moved in a plate perpendicular to the conveyance direction by a rotary solenoid 24. Fixed guide member 22 is fixed to the guide rail 2, and rotary solenoid 24 is supported by the side portion of the fixed guide member. Wheel guide rails 22A and 23A are consecutively provided on upper portions of the fixed guide member 22 and the shifting switch member 23, respectively, wheel guide rails 22A and 23A having a predetermined inclined angle for introducing and guiding the wheel 12. As will be appreciated, the rotation speed and rotation angle of the tray 6 are, respectively, determined by the inclined angle and the inclined length of wheel guide rails 22A and 22B.

When the sorter 1 on which the package is carried approaches a sorting position where the wheel guide member 21 is provided but the package is not to be sorted, shifting switch member 23 is held in a state where it falls down outside the guide rail 2 (a stand-by state), so that the wheel 12 is prevented from contacting with the wheel guide member. As a consequence, drive lever 11 is not swung so as to rotate the tray 6, so that the sorter passes that position with the tray held horizontally. By contrast, if the sorter approaches a predetermined sorting position where the package on the tray 6 is to be sorted, rotary solenoid 24 drives shift switch member 23 to move it swingingly from the stand-by position to a position where the wheel guide rail 23A of the shift switch member side successively communicates with the wheel guide rail 22A of the fixed guide member side.

Wheel 12 travels from a rail inlet 26 of the shift switch member 23 inside the wheel guide rail 23A toward a rail outlet 27 of the fixed guide member 22 in conjunction with the movement of the sorter 1. As a result of this travel of wheel 12, drive lever 11 is swung in the direction opposite to the conveyance direction to rotate the hollow rotating member 7 counterclockwise. Thus, the tray is rotated while increasing the inclination thereof. When wheel 12 has reached rail outlet 27 in fixed guide member 22, the swinging angle of drive lever 11 reaches a maximum, so that the rotation of the tray 6 is interrupted with the maximum inclination angle. As a result, the package mounted on the tray is slid downward along the inclination of the tray, and the package is sorted.

Figure 7:
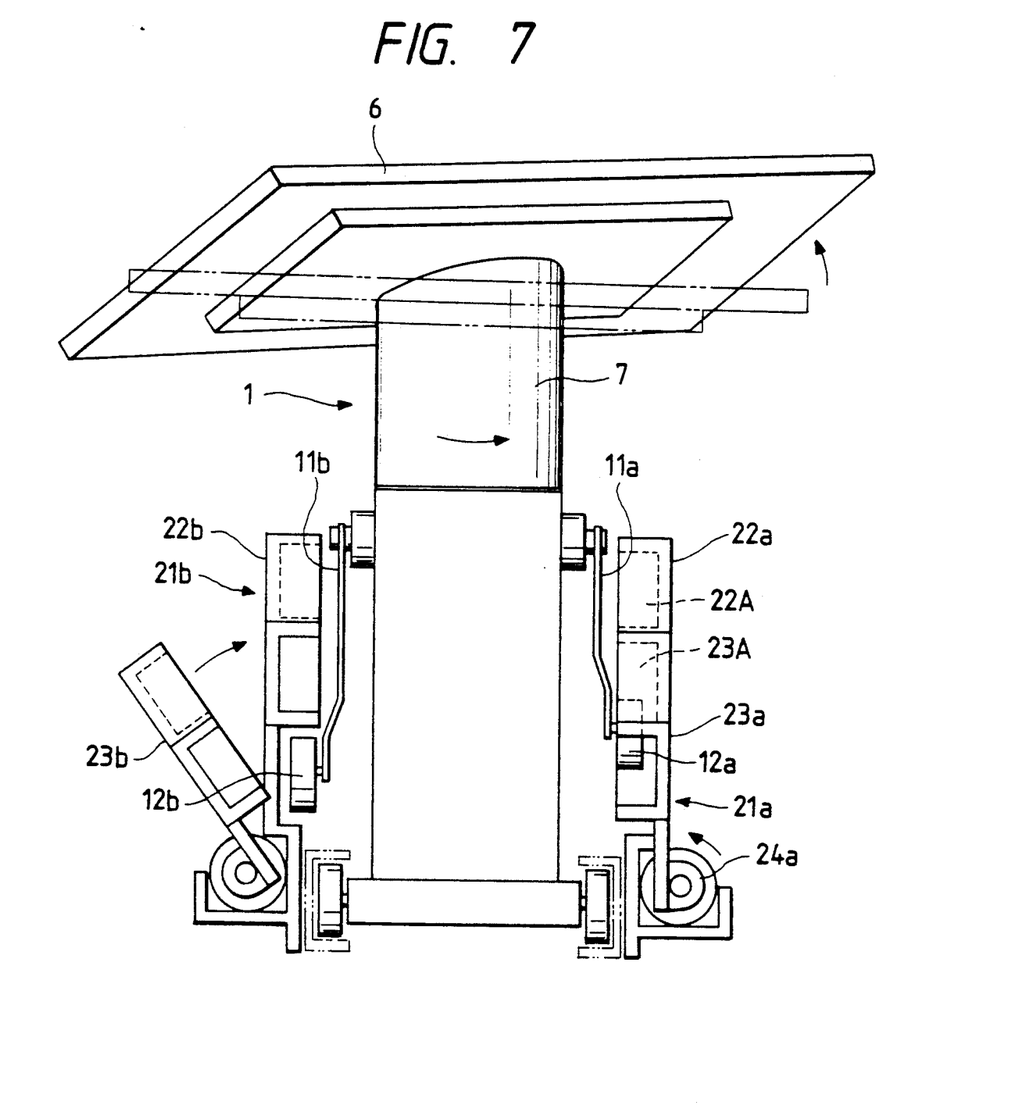
FIG. 7 is a front view showing a positional relationship between the tray type sorting apparatus and the wheel guide member.

FIG. 7 is a front view showing a structural arrangement between wheel guide members 21 and the sorter 1. In the normal status where the sorting operation is not performed, the shift switch member 23b falls down outward to be kept away from the wheel path as in the wheel guide member 21 on the left side, so that wheel 12b is prevented from contact with not only the shift switch member 23b, but also the fixed guide member 22b. Therefore, the drive lever 11b is not swung and therefore the hollow rotating member 7 is not rotated.

When the sorter approaches a predetermined sorting position where the package mounted on the tray 6 is to be slid downward, rotary solenoid 24a is actuated to rotatingly move the shift switch member 23a from the kept-away position to a position where the wheel guide rail 22A of the fixed guide member 22a communicates with the wheel guide rail 23A of the shift switch member.

Figure 8:
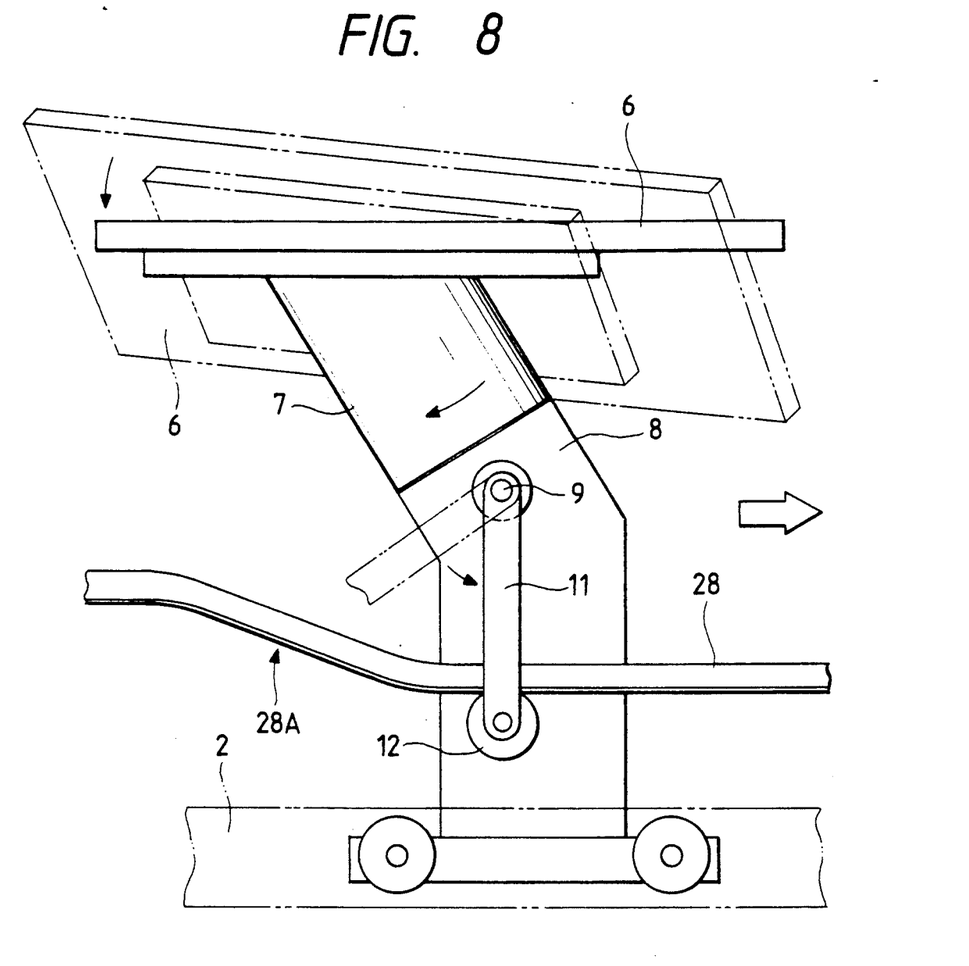
FIG. 8 is a side view showing a positional relationship between the tray type sorting apparatus and the return rail.

FIG. 8 is a side view showing a return rail 28 for returning the tray 6 from its inclined state to its horizontal state. After completion of the sorting operation the entire sorter 1 runs on the guide rails 2 so that the wheel 12 of the drive lever travels along the lower surface of the return rail 28. The return rail 28 has an inclined portion 28A sloping downward in the conveyance direction, so that the wheel 12 travelling along the return rail 28 can return drive lever 11 to the original vertical state. As a result, operation arm 9 is swung in the conveyance direction to reversely rotate hollow rotating member 7 in the clockwise direction, so that the tray 6 can easily be returned from an inclined state to the normal horizontal state.

In the sorter according to this embodiment, the rotating mechanism only comprises a support portion between the hollow support member 8 and the operation arm 9 and a coupling portion between the hollow support member 8 and the hollow rotating member 7, at which rotation can be smoothly performed with a bearing mechanism or the like. Further, hollow rotating member 7 can be rotated and/or locked by the operation arm 9 and the spherical cam plate using extremely simple construction. Therefore, the entire construction of the sorter 1 is simplified, and the number of component parts and the work required for assembling it is reduced.

Next, a second embodiment of the present invention will be described with reference to FIGS. 9 and 10.

Figure 9:
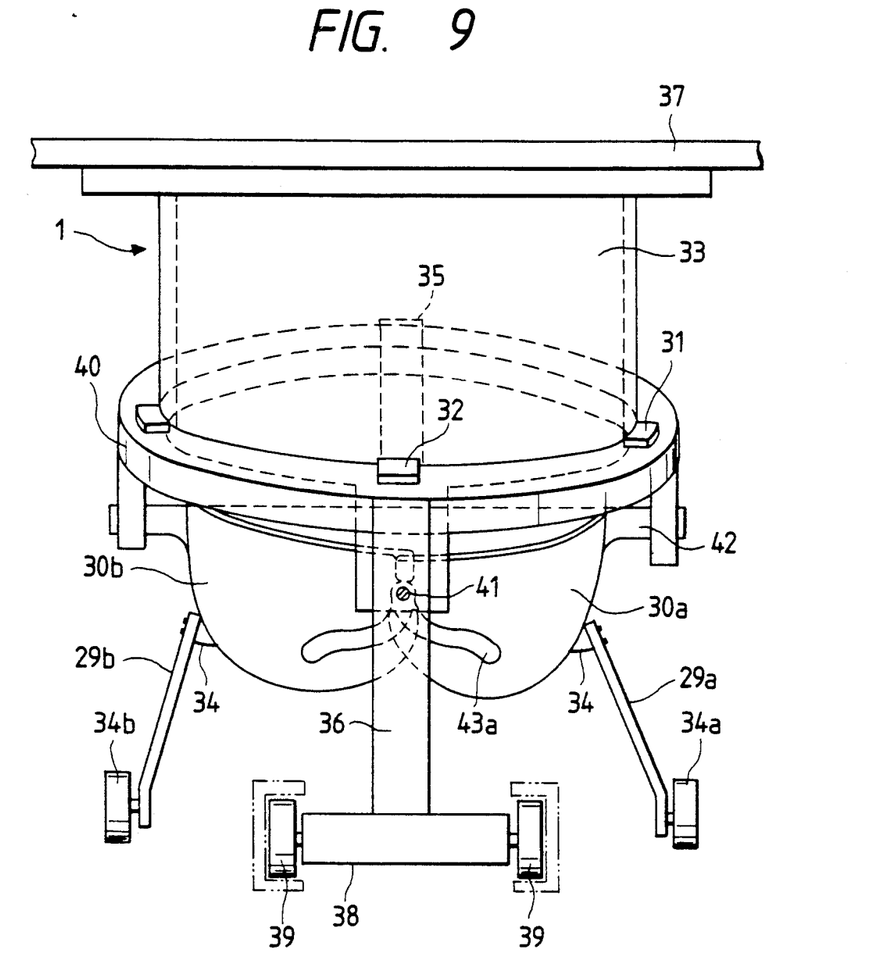
FIG. 9 is a front view showing an entire construction of a sorting apparatus which is a second embodiment of the present invention.
Figure 10:
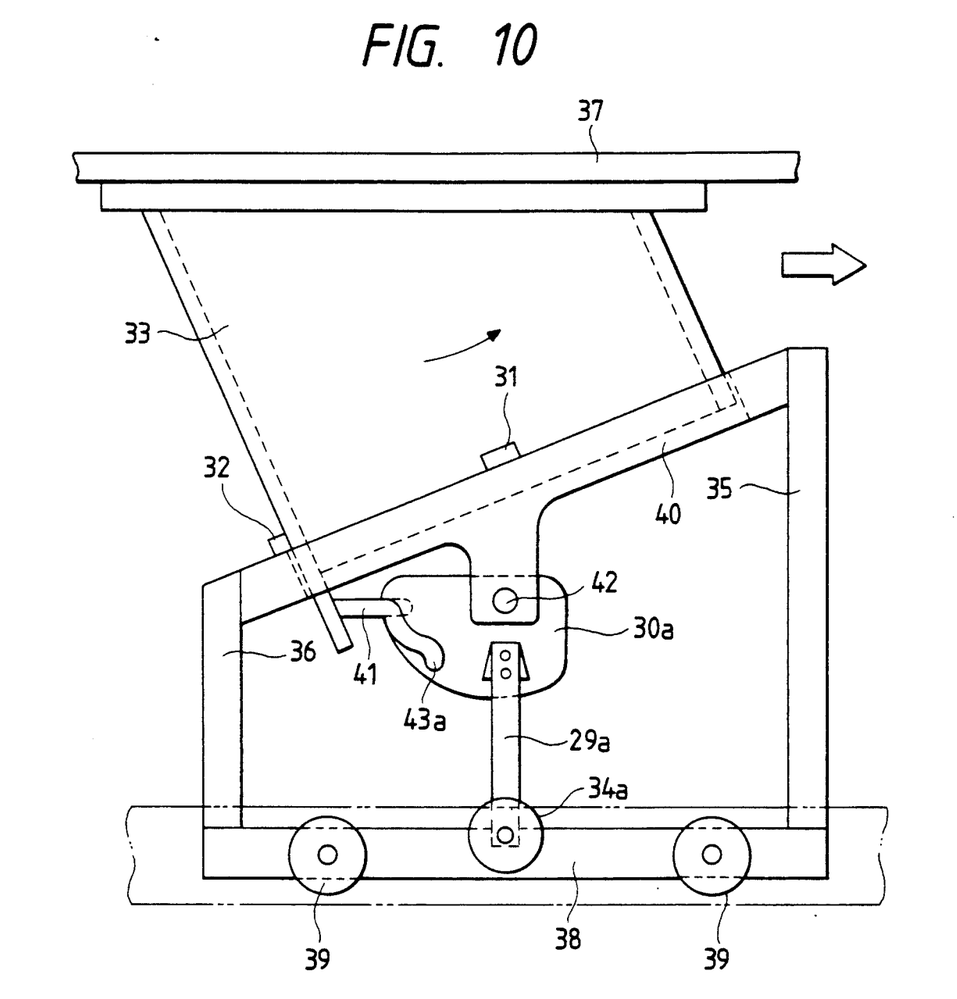
FIG. 10 is a side view showing the entire construction of the sorting apparatus which is the second embodiment.

FIG. 9 is a front view of the second embodiment and FIG. 10 is a side view thereof. A support stand 35 and another support stand 36 shorter than the former support stand 35 are fixingly provided perpendicularly on the leading end and trailing end of a flatcar 38, respectively. A ring-like support member 40, onto which a support shaft 42 supporting spherical cam plates 30a and 30b thereon is fixed, is provided obliquely downward on the support stands 35 and 36 of the flatcar 38. Hollow rotating member 33 is coupled to an inner circumferential surface of the ring-like support member 40 through a bearing mechanism or the like. The hollow rotating member is shaped obliquely since the ring-like support member 40 is also obliquely shaped. Therefore, in order for a tray 37 on which a package is to be mounted to be disposed horizontally, the tray 37 is fixed obliquely relative to the hollow rotating member 33.

The benefit of this second embodiment is that the major parts, e.g., spherical cam plates 30a and 30b, are supported through the ring-like support member 40 and the support stands 35 and 36, thereby dispensing with the hollow support member, and that the drive levers 29a and 29b are directly welded to welding portions 34 at respective sides of the spherical cam plates 30a and 30b, so as to dispense with the operation arms. Therefore, the drive mechanism is substantially the same as that in the first embodiment, but since there is no hollow support member, the spherical cam plates are exposed to the outside to make it easier to assemble the component parts and to perform maintenance. Further, since there are no operating arms, the process for manufacturing the spherical cam plate is further simplified.

As in the first embodiment, motion of each member on the right-hand side relative to a center is explained. In the sorter 1 running with the rollers 39 inside the guide rails, the drive lever 29a is swung in the direction opposite to the conveyance or running direction by the wheel 34 travelling along the wheel guide member (not shown in the drawings). As a result, spherical cam plate 30a integral with drive lever 29a is also swung with the same swinging angle around the outer circumference of the support shaft 42. Therefore, the pin 41 disposed at the lower portion of the hollow rotating member 33 and fitted into the cam groove 43a, is slid rightward in the groove, so as to rotate hollow rotating member 33 counterclockwise together with tray 37 and gradually increase the inclination of tray 37, so that the package can be sorted.

When projection 32 provided on hollow rotating member 33 abuts, in conjunction with the rotation, against swing stopper 31 provided on the ring-like support member 40, the rotation can be stopped before pin 41 reaches the bottom portion of cam grooves 43a. Therefore, by positioning the projection 32 or the swing stopper 31 at a desired position, an appropriate inclination angle of the tray 37 can be selected, to prevent damage to the package due to excess inclination of the tray 37.

As with the first embodiment, the drive means for moving the sorting apparatus may be a linear motor, a friction drive, worm wheel, or the like, and is specifically not be restricted to a specific arrangement. Also, a running means may be arranged such that a sorter is directly fixed onto a conveyor instead of rollers. In such events, the flatcar is arranged so that it can be applied to various motor means.

Figure 11:
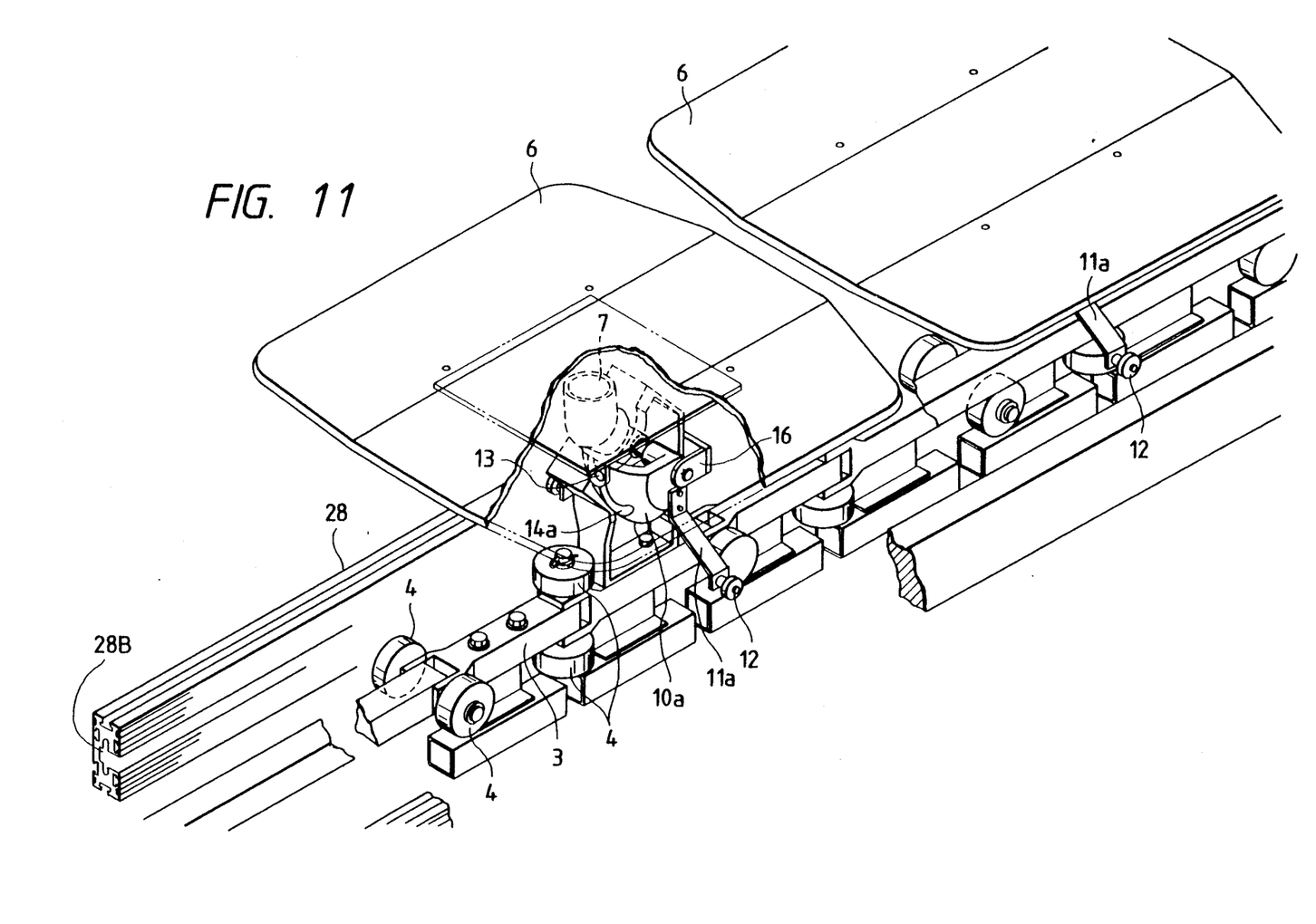
FIG. 11 is a perspective view showing a sorting apparatus which is a third embodiment of the present invention.

FIG. 11 shows a third embodiment of the present invention. The basic construction of the third embodiment is similar to those of first and second embodiments, so that a part corresponding functionally to that in the first embodiment is designated by the same reference numeral and, therefore, detailed explanation is omitted. In the third embodiment, a large number of bases 3 are provided as conveyor elements which are connected to one another. The sorters of the present invention are mounted onto appropriate bases 3 to form an endless conveyor line, which rotates in a horizontal plane, but also could run or move in other direction.

Although the embodiments of the present invention have been explained above, the present invention should not be restricted thereto or thereby. For example, although the case where the sorting direction for the package is obliquely forward has been illustrated, it is possible for the package to be slid downward by rotating the tray obliquely backward. Also, although each spherical cam plate is shown as formed as a partial sphere, it may be formed as a half-sphere. It may also be applicable that to construct the pair of spherical cam plates as a sphere. Further, the pin may be mounted on a side of the sorter upstream of the conveyance, and in this state the cam grooves would also be arranged at the upstream side. The pin may have a roller rotatably mounted thereon for smooth movement. Furthermore, the configuration of the hollow rotating member should not be restricted to a circular column; e.g., it may be formed as a prism. And, the bent angle of the hollow rotating member 8 is not restricted to a specific angle.

As explained above, in the sorting apparatus according to the present invention, the three-dimensional motion of the tray can be realized with a two-dimensional motion, i.e., the swinging motion of the drive lever, and the shift switch mechanism is simplified in construction. Further, transverse un-natural sliding forces do not act on the wheel of the drive lever, thereby enhancing reliability and reducing the number of the component parts and assembling work therefor. Further, in addition to he simplification of the motion of sorting operation, the speed of the inclination of the tray can be controlled so that the sorting operation can be performed without shock to the packages.

What is claimed is:

1. A sorting apparatus which comprises a hollow rotating member rotatable at a predetermined inclined angle relative to a vertical direction on a flatcar running along a guide rail, and a tray fixed to an upper portion of said hollow rotating member for mounting a package thereon, so that said package is slid downward by tilting said tray, said sorting apparatus further comprising:

a pair of spherical cam plates each provided with a cam groove for controlling the rotation of said hollow rotating member;

said cam plates rotatable about a support shaft disposed perpendicularly to a running direction;

drive levers swingable two-dimensionally together with said respective spherical cam plates for controlling the rotation thereof;

a pin projectingly provided on an inner circumferential surface of a lower portion of said hollow rotating member so as to be fitted in said cam grooves; and said pin sliding along said cam groove in conjunction with the rotation of said spherical cam plate, thereby rotating and tilting said tray three-dimensionally.

2. The sorting apparatus according to claim 1, further comprising:

a support member whose lower end is fixed onto said flatcar and whose upper end rotatably supports said hollow rotating member, said cam plates being rotatably supported on said support member through said support shaft.

3. The sorting apparatus according to claim 2, wherein each of said spherical cam plates is formed with an integral hollow operation arm into which said support member is inserted, each of said drive lever being securely fixed to corresponding hollow operation arm.

4. The sorting apparatus according to claim 2, wherein said drive levers are securely fixed to respective spherical cam plates.

5. The sorting apparatus according to claim 1, wherein said pin is movable between first and second positions in said guide groove, said pin in each of said first and second positions rotationally locks said hollow rotating member.

6. The sorting apparatus according to claim 1, wherein each of said driven levers has a wheel at a distal end thereof, and further comprising:

a wheel guide member disposed at a predetermined position on said guide rail for swinging corresponding drive lever during the running of said flat car, said wheel guide member selectively introducing and guiding said wheel at a predetermined inclined angle relative to said guide rail.

7. The sorting apparatus according to claim 6, further comprising:

a return rail disposed on said guide rail and succeeding to said wheel guide member for swinging and returning said corresponding drive lever thereby returning said tray to a horizontal status.

8. The sorting apparatus according to claim 1, wherein each of said cam grooves has a predetermined length which defines a rotational angle of said tray.

9. The sorting apparatus according to claim 6, wherein said predetermined inclined angle defines a speed of rotation of said tray.

10. A sorting process for delivering a package mounted onto a tray therefrom to its sorting area while moving in a first direction a sorting apparatus including at least one rotatable spherical cam plate provided with a cam groove and a pin projectingly provided on a rotating member and slidably fitted into said cam groove, said tray being fixed onto said rotating member, said sorting process comprising the steps of:

rotating a spherical cam plate in conjunction with the movement of said sorting apparatus when said sorting apparatus reaches in proximity of the sorting area of said package;
allowing said pin to slide along said cam groove in conjunction with the rotation of said spherical cam plate; and
rotating said rotating member about an axis generally inclined relative to said first direction by said pin sliding along said cam groove to thereby rotate and tilt said tray.

* * * * *